Patented Mar. 1, 1949

2,462,933

UNITED STATES PATENT OFFICE 2,462,933

PROCESS FOR MANUFACTURING ARTIFICIAL FIBER FROM PROTEINS CONTAINED IN COTTON SEED

Jett C. Arthur, Jr., Melvin L. Karon, Adrian F. Pomes, and Aaron M. Altschul, New Orleans, La., assignors to the United States of America as represented by the Secretary of Agriculture No Drawing. Application March 21, 1947, Serial No. 736,182

12 Claims. (Cl. 106—154)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the preparation of fibers from proteins of vegetable origin. It particularly concerns the chemical pretreatment of protein derived from cottonseed meal prior to spinning the protein into fibers.

One object of this invention is to provide a method of preparing alkali suspensions, that is, dispersions or solutions, of cottonseed protein as spinnable liquids of a viscosity enabling them to be extruded through orifices into coagulating baths to form fibers.

In the normal practice of preparing a dispersion of vegetable protein or casein suitable for spinning, the protein is dispersed in alkali with or without the aid of other chemicals, and this dispersion is aged until the resulting solutions have properties suitable for spinning into fibers. The length of time during which the protein dispersion must age will depend on the protein itself, the temperature of the dispersion, the concentration of alkali, and the presence of other chemicals.

When it is attempted to disperse cottonseed protein in alkali by the above-mentioned methods, dispersions suitable for spinning are not obtained. Either the protein does not form a uniform dispersion, or, if high percentages of alkali are used, the mixture of alkali and protein gels and cannot be extruded through a small orifice.

Apparently cottonseed protein, as it is normally prepared from cottonseed meal, is obtained in such a form and contains such cross-linkages that it is impossible to prepare from it dispersions suitable for spinning into fibers. In the process of our invention, the cottonseed protein is first treated with acids in such manner as partially to denature it, to break the cross-linkages which interfere with the dispersion, and to transform the protein into a form from which dispersions can be made. Another result of this treatment is to change the structure of the protein into a more linear form so that its dispersions become tacky and stringy and generally more suitable for fiber production.

Our invention in its preferred form comprises the following steps:

(1) Extracting the protein from oil-free cottonseed meal by dilute alkali;

(2) Precipitating the protein from the extract by adjusting the pH of the extract with suitable acid to the range of minimum solubility of the protein;

(3) Treating the dried protein with suitable concentrations of either mineral or organic acids to improve its properties;

(4) Dispersing the acid treated protein in alkali to form a dispersion suitable for spinning into a fiber;

(5) Spinning the protein into a coagulating bath; and (6) Stretching and further treating the fiber to make it suitable for use in textiles as a substitute for wool and other fibers, or for use in making bristles, or sutures.

Our invention is not dependent upon the method used for the preparation of the cottonseed protein. Cottonseed meals which have been prepared either by removing the oil and pigment glands from flaked cottonseed with a solvent consisting of a mixture of petroleum naphtha and trichlorethylene, or by removing the oil with diethyl ether, have been found to be suitable as a raw material for the preparation of cottonseed protein for the production of fibers by the process of this invention. The pigment-gland-free embryo tissue prepared by the processes described in the United States patent application of Boatner, Hall, and Merrifield, Serial No. 675,118, filed June 7, 1946, can also be employed.

Protein prepared by extraction of cottonseed meal with either sodium hydroxide or sodium sulfite, followed by precipitation of the protein from the aqueous extract with sulfur dioxide, sulfuric acid, or hydrochloric acid, has been found to be suitable for the production of fibers by the process of this invention.

Protein curds which have been dried either by the use of organic solvents at room temperature, or in a vacuum oven at a temperature below 50° C., have been found equally suitable for the production of fibers by the process of this invention.

Strong and weak acids of the class of organic and inorganic acids, as for example, trichloracetic, citric, nitric, and boric acids, have been found effective as agents in step (3) for modifying cottonseed protein so as to make it dispersible in alkali in a form which can be spun into fibers by the process of this invention. Ratios of acid to protein within the range of concentrations from 1 to 20 to 1 to 1 have been found effective in achieving the desired modification of cottonseed protein so as to render it dispersible in alkali in a form suitable for spinning into fibers. Treatment of the protein with acids in the aforementioned concentrations, preferably for one minute to one hour, at 20° to 40° C., have been found to be effective in achieving the desired modification of the protein so as to render it dispersible in alkali in a form suitable for spinning into fibers. The acid is preferably employed in such amount as to form a 0.03 M to 1 M aqueous solution.

Dispersions in alkali of cottonseed protein treated in the afore-mentioned manner within the range of concentration of 10 to 20 percent of protein, and having viscosities in the range of viscosity of 4 to 150 poises have been found to be suitable for spinning into fibers.

The coagulating solution or bath into which the protein dispersion in alkali is spun to produce a fiber may consist of a solution of acid or a solution containing a mixture of acids and salts. For example, it has been found that sulfuric, nitric, or hydrochloric acids, either with or without the addition of the salts of these acids, have been found to be effective as a coagulating bath or medium.

The process of our invention is illustrated by the following examples:

Example I

Cottonseed meal from which the oil and pigment glands had been removed by means of a mixture of Skellysolve B, a petroleum naphtha, and trichlorethylene, was extracted for 1 hour at 25° C. with a 0.2 N solution of sodium sulfite which served as the source of alkali. The ratio of extracting liquid to meal was 10 to 1 and the pH of the mixture was 7.4. The insoluble material was removed by centrifugation, and the extract was clarified by further high speed centrifugation. The clear extract containing the cottonseed protein was made acid to a pH value of 4 by addition of sulfur dioxide which served as the source of acid. The precipitated protein was washed with acetone and dried at 25° C.

One part by weight of the said dried protein was mixed with 6.5 parts, by weight, of water and 1/20 part by weight of trichloroacetic acid (the acid being, therefore, in 0.05 M concentration), and the mixture was stirred for 30 minutes at 25° C. A 50 percent solution of sodium hydroxide (3.8 parts by weight) was added to the above described mixture and the solution stirred for one hour until equilibrium was attained. The protein dispersion thus formed showed no evidence of the existence of free particles under the microscope. It had a viscosity of 150 poises at a pH value of 12.7.

The dispersion of protein in alkali was then spun into a coagulating bath containing 2 percent of hydrochloric acid and 10 percent of sodium chloride. The fiber, thus obtained, was stretched and hardened to form a finished product suitable for use in the manufacture of textiles, or for the production of bristles, sutures, and so forth.

Example II

One part by weight of dry protein, prepared in the manner described in the first paragraph of Example I, was mixed with six parts by weight of water and 1/20 part by weight of nitric acid (the mixture, therefore, containing nitric acid in about 0.20 M concentration), and the mixture was stirred for 30 minutes at 25° C. A 50 percent sodium hydroxide (3.8 parts by weight) solution was then added to this mixture and it was stirred for one hour until equilibrium was attained. The final dispersion had a viscosity of 120 poises at a pH value of 12.8 and was homogeneous upon microscopic examination.

This dispersion was spun through a spinneret into a bath consisting of an aqueous solution of 4 percent sulfuric acid and 10 percent sodium sulfate. The fiber, thus obtained, could be stretched and hardened to produce a finished product suitable for use in the manufacture of textiles, bristles, sutures, and so forth.

Example III

One part by weight of dry protein, prepared in the same manner as described in the first paragraph of Example I, was mixed with 6 parts by weight of water and 1/20 part by weight of boric acid (the mixture, therefore, containing boric acid in about 0.05 M concentration), and the mixture was stirred for 30 minutes at 25° C. A 50 percent sodium hydroxide (3.8 parts by weight) solution was then added to this mixture, and it was stirred for one hour until equilibrium was attained. The final dispersion had a viscosity of 90 poises at a pH value of 12.8 and was homogeneous upon microscopic examination.

The dispersion was spun through a spinneret into a bath consisting of an aqueous solution of 2 percent hydrochloric acid and 10 percent sodium chloride. The fiber, thus obtained, was stretched and hardened to produce a finished product suitable for the manufacture of textiles, bristles, sutures, and so forth.

In place of boric acid, in this example, citric acid present in 0.03 M concentration can be employed.

Example IV

Cottonseed meal, prepared as described in the first paragraph of Example I, was extracted for 1 hour at 25° C. with sodium hydroxide solution at pH 9.1. The ratio of the extracting liquid to meal was 10 to 1. The insoluble material was removed by centrifugation and the extract was clarified by further high speed centrifugation. The clear extract containing the cottonseed protein was made acid to a pH value of 4.2 by the addition of hydrochloric acid. The precipitated protein was washed with acetone and dried at 25° C.

One part by weight of this protein was mixed with 6.5 parts by weight of water and 1/20 part by weight of trichloroacetic acid (the acid being, therefore, in 0.05 M concentration), and the mixture was stirred for 30 minutes at 25° C. A 50 percent solution of sodium hydroxide (3.8 parts by weight) was added to the above mixture and it was stirred for one hour until equilibrium was attained. The protein dispersion, thus formed, showed no evidence of the existence of free particles upon microscopic examination.

This protein dispersion was then spun into a precipitating bath containing 20 percent sulfuric acid. The fiber, thus obtained, was stretched and hardened to form a finished product suitable for use in the manufacture of textiles and related materials.

Example V

Cottonseed meal from which the oil had been removed by means of extraction with diethyl ether was extracted for 1 hour at 25° C. with a 0.2 N solution of sodium sulfite which served as the source of alkali. The ratio of extracting liquid to meal was 10 to 1 and the pH value of the mixture was 7.4. The insoluble material was removed by centrifugation and the extract was clarified by further high speed centrifugation.

The clear extract containing the cottonseed protein was made acid to a pH value of 4 by addition of sulfur dioxide which served as the source of acid. The precipitated protein, thus obtained, was dried in a vacuum oven at about 45 millimeters of mercury and below 50° C.

One part of this dried protein by weight was mixed with 6.5 parts by weight of water and 1/20 part by weight of trichloroacetic acid (the acid being, therefore, in 0.05 M concentration) and the mixture was stirred for 30 minutes at 25° C. A 50 percent solution of sodium hydroxide (3.8 parts by weight) was added to the above mixture and it was stirred for one hour until equilibrium was attained. The protein dispersion, thus formed, showed no evidence of the existence of free particles upon microscopic examination.

The protein dispersion was then spun into a precipitating bath containing 2 percent hydrochloric acid and 10 percent sodium chloride. The fiber, thus obtained, was stretched and hardened to form a finished product suitable for use in the manufacture of textiles, bristles, sutures, and so forth.

Having thus described our invention, we claim:

1. A method of preparing alkaline dispersion of cottonseed protein as spinnable liquids of a viscosity enabling them to be extruded through orifices into coagulating baths to form fibers, which comprises treating an aqueous suspension of cottonseed protein of 10 to 20 percent concentration with acid, the acid being present in a concentration of 0.03 M to 1 M, for a period up to one hour, at a temperature of about 20° to 40° C. and then treating the protein with alkali to form a dispersion.

2. The method of claim 1 wherein the concentration of the aqueous cottonseed protein suspension is 15 percent and trichloracetic acid is present in 0.05 M concentration, the treatment being for ½ hour at 25° C.

3. The method of claim 1 wherein the concentration of the aqueous cottonseed protein is 15 percent and nitric acid is present in 0.05 M concentration, the treatment being for ½ hour at 25° C.

4. The method of claim 1 wherein the concentration of aqueous cottonseed protein is 15 percent and citric acid is present in 0.03 M concentration, the treatment being for ½ hour at 25° C.

5. A method of producing artificial fibers from cottonseed protein, which comprises treating an aqueous suspension of cottonseed protein of 10 to 20 percent concentration with acid, the acid being present in a concentration of 0.03 M to 1 M, for a period up to one hour, at a temperature of about 20° to 40° C. and then treating the protein with sufficient alkali to form a uniform dispersion with a viscosity within the range of 4 to 150 poises and extruding the said dispersion through an orifice into a coagulating bath to form fibers.

6. The method of claim 5 wherein the acid is trichloracetic acid present in 0.05 M concentration, the treatment being at ½ hour at 25° C.

7. The method of claim 5 wherein the concentration of the aqueous suspension of cottonseed protein is 15 percent and the nitric acid is present in 0.20 M concentration, the treatment being at ½ hour at 25° C.

8. The method of claim 5 wherein the concentration of aqueous suspension of cottonseed protein is 10 to 20 percent and the acid is citric acid present in 0.03 M concentration, the treatment being at ½ hour at 25° C.

9. A spinnable liquid comprising an aqueous alkaline, uniform dispersion of oil-free cottonseed protein with a viscosity in the range of 4 to 150 poises and of a concentration of 10 to 20 percent of protein, said protein having been subjected to a partial denaturation by treatment with aqueous acid, in a concentration of 0.03 M to 1 M for a period up to one hour at about 20° to 40° C., and to subsequent dispersion in alkali.

10. The product defined in claim 9 and in which the protein is free of pigment-glands.

11. The process described in claim 5 in which the aqueous suspension of cottonseed protein so treated was prepared from protein made by extracting the protein from cottonseed meal with an alkaline reacting protein extracting agent, clarifying the extract, and precipitating the protein from the clarified extract with an acidic protein precipitating agent.

12. In a method of producing, from cottonseed protein, spinnable liquids of a viscosity enabling them to be extruded through orifices into coagulating baths to form fibers, the improvement comprising extracting the protein from cottonseed meal with an aqueous alkaline reacting protein extracting agent, the meal being one from which the oil and pigment glands had been removed, clarifying the extract, precipitating the protein from the clarified extract with an acidic protein precipitating agent, treating an aqueous suspension of the protein, of 10 to 20 percent concentration, with acid, the acid being present in a concentration of 0.03 M to 1 M, for a period up to one hour, at a temperature of about 20° to 40° C., and treating the protein with sufficient alkali to form a dispersion with a viscosity within the range of 4 to 150 poises.

JETT C. ARTHUR, JR.
MELVIN L. KARON.
ADRIAN F. POMES.
AARON M. ALTSCHUL.

REFERENCES CITED

The following references are of record in the file of this patent:

UNITED STATES PATENTS

| Number | Name | Date |
|---|---|---|
| 2,194,867 | Olcott | Mar. 26, 1940 |
| 2,310,221 | Denyes | Feb. 9, 1943 |
| 2,333,526 | Denyes | Nov. 2, 1943 |

OTHER REFERENCES

Industrial & Engineering Chemistry, vol. 38, June 1946, pages 658–662.